June 5, 1928.

B. JEROME ET AL 1,672,161

VEHICLE HAVING BRAKES

Filed March 10, 1924

Inventors
Benjamin Jerome and
Walter D. Appel
By their Attorneys

June 5, 1928.  1,672,161
B. JEROME ET AL
VEHICLE HAVING BRAKES
Filed March 10, 1924  2 Sheets-Sheet 2
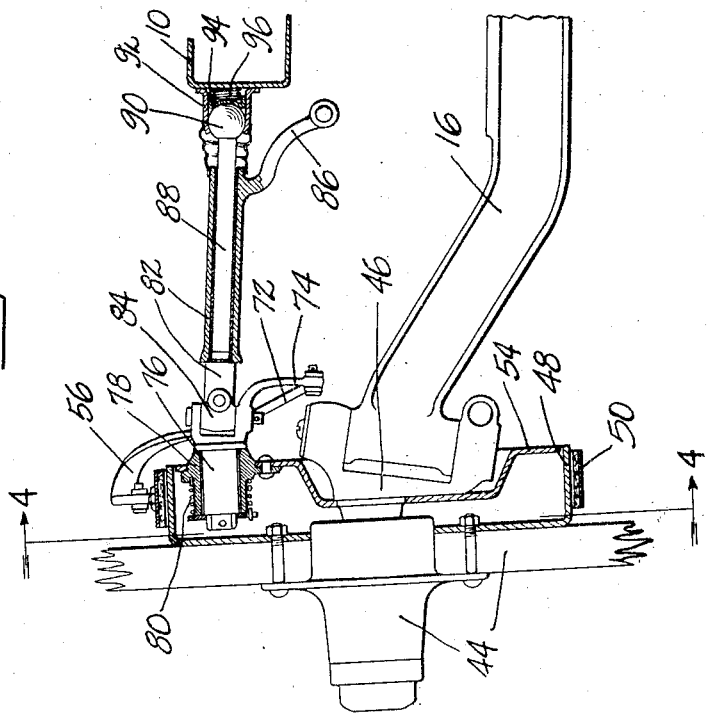
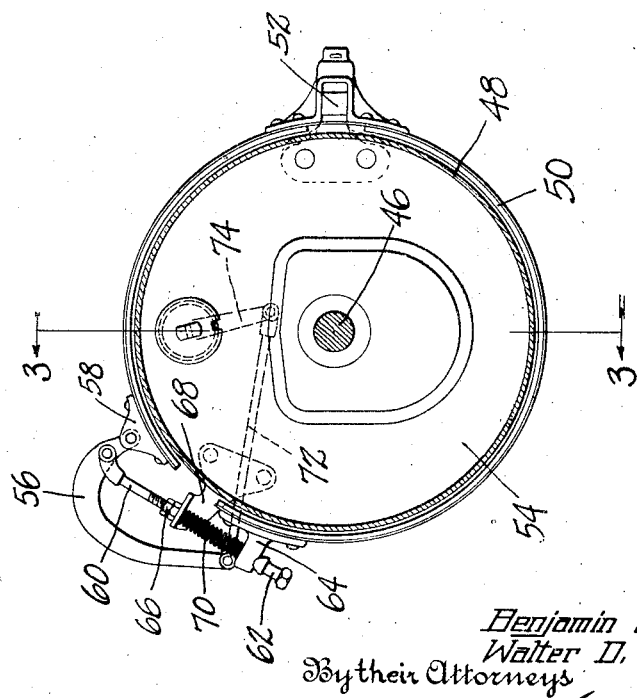
Inventors
Benjamin Jerome and
Walter D. Appel
By their Attorneys Patented June 5, 1928.

1,672,161

UNITED STATES PATENT OFFICE.

BENJAMIN JEROME AND WALTER D. APPEL, OF PONTIAC, MICHIGAN, ASSIGNORS TO GENERAL MOTORS CORPORATION, OF DETROIT, MICHIGAN, A CORPORATION OF DELAWARE.

VEHICLE HAVING BRAKES.

Application filed March 10, 1924. Serial No. 698,085.

This invention relates to brakes, and is illustrated as embodied in an automobile having brakes on all four of its road wheels.

An object of the invention is to provide simple and efficient operating connections for such brakes. In one desirable arrangement, the brakes on the same side of the car are operated by links parallel to and outside of the corresponding side member of the chassis frame, which links are preferably connected to the protruding end of a driver-controlled rock shaft supported by the chassis frame.

The above and other objects and features of the invention, including various novel combinations of parts and desirable particular constructions, will be apparent from the following description of one illustrative embodiment shown in the accompanying drawings, in which:

Fig. 3 is a vertical transverse section showing one of the front brakes, on the line 3—3 of Fig. 4; and Fig. 4 is a section on the line 4—4 of Fig. 3, showing the front brake in side elevation.

Figure 1:
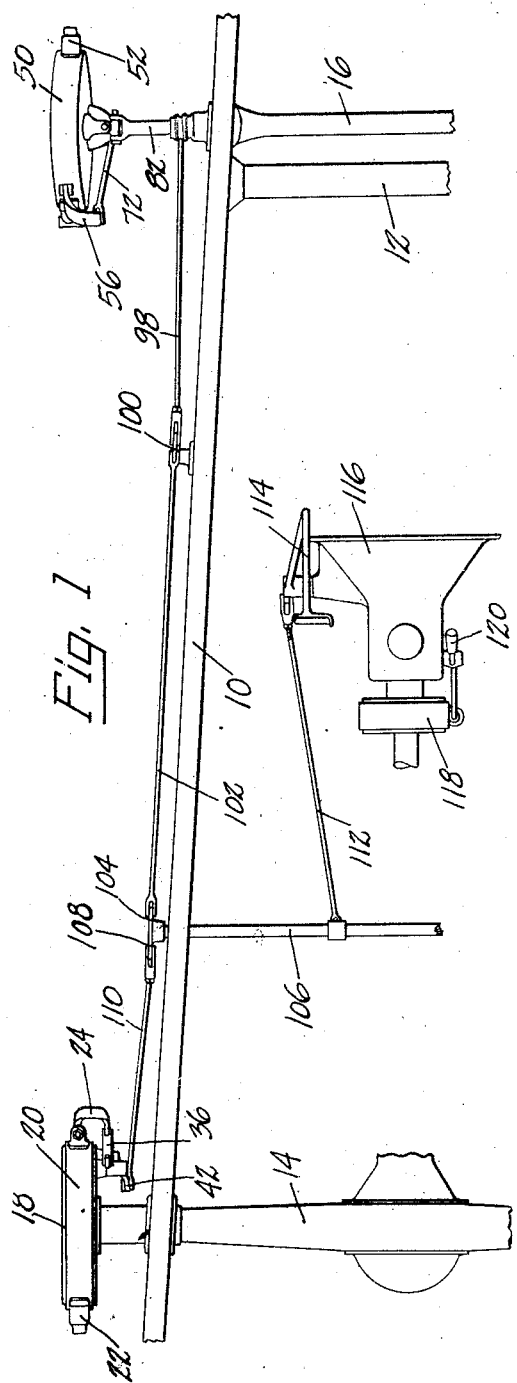
Fig. 1 is a top plan view of part of an automobile chassis equipped with front and rear brakes.
Figure 2:
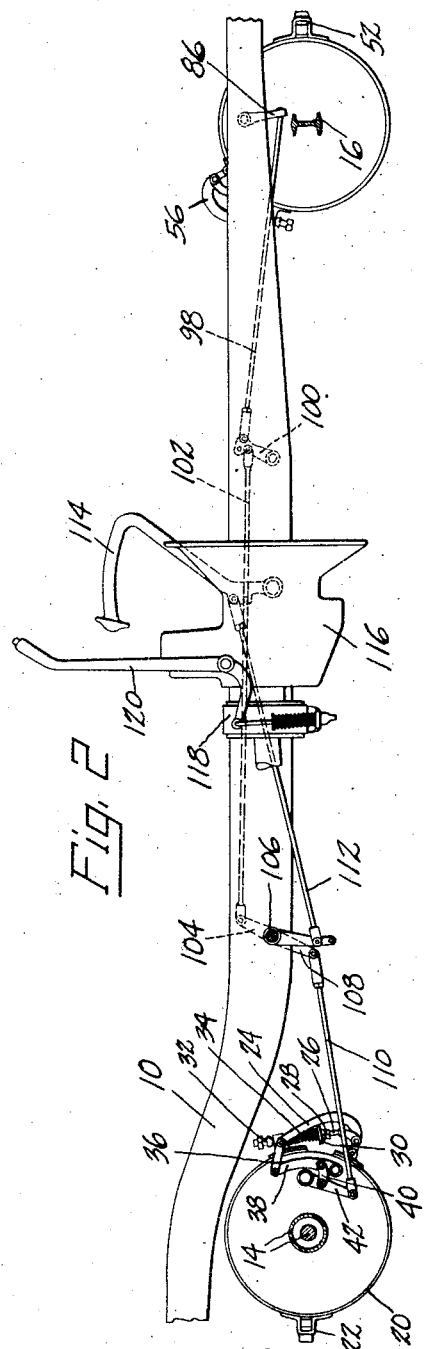
Fig. 2 is a side elevation of part of such a chassis.

The chassis shown in the drawings includes a frame having side members 10 and cross members 12, supported in any suitable manner by springs on a rear axle 14 and front axle 16. Journaled on the rear axle are wheels having brake drums 18, surrounded by bands 20 carried by anchors 22, one end of each band being pivotally connected to a toggle lever 24 and the other end to a link 26 pivotally connected to the toggle lever.

Each link 26 has a stop formed by adjustable locknuts 28, which in idle position engage a perforated fixed bracket 30 through which the link passes, and each link also carries an abutment 32 engaging a perforated lug on the brake band. Each link is surrounded by a spring 34 confined between bracket 30 and the lug on the brake band, and arranged in such a manner as to urge the brake band into its expanded or idle position. Toggle lever 24 is connected by links 36 to an intermediate lever 38 connected by links 40 to an operating lever 42.

Each front wheel 44 is journaled on a spindle carried by a knuckle 46 swiveled by means of a king pin to one end of front axle 16, and each front wheel carries a brake drum 48 surrounded by a brake band 50 supported by an anchor 52 on a plate 54 carried by knuckle 46.

Band 50 is contracted in applying the brakes, by a toggle lever 56 pivoted to a lug 58 carried by one end of the band, and by a link 60 having an adjustable abutment 62 engaging a perforated lug 64 on the other end of the band, through which lug the link passes. The link carries an adjustable stop in the form of locknuts 66 which determines the idle position of the band by engagement with a bracket 68 carried by plate 54, and the brake band is urged away from the drum by a spring 70 surrounding link 60 and confined between lug 64 and bracket 68. The parts so far described are shown as being substantially the same as the corresponding parts of the rear brakes.

Toggle lever 56 is connected by a rigid link 72 to an arm 74 depending from a flexible operating shaft including a cylindrical part 76 carrying the arm 74 and journaled in a bushing 78 carried by plate 54, the arm 74 being substantially vertical when the brakes are on. A torsion spring 80 is connected at opposite ends to bushing 78 and part 76 in such a manner as to urge the arm 74 toward idle position. The flexible operating shaft also includes a sleeve member 82 connected to the part 76 by a universal joint 84 and provided with a brake operating arm 86, the sleeve member being supported by a sliding rod or shaft 88 having a ball head 90 universally held in a socket 92 on the adjacent side frame member 10. The head 90 is held against undesirable play by a follower 94 held by a spring 96.

Like the arm 74, arm 86 is substantially vertical when the brakes are on, as is also one of the axes of the universal joint 84. The approximately vertical axis of the universal joint is arranged, however, at an acute angle with respect to the axis of the king pin about which knuckle 46 swivels in steering the vehicle. As is well known to those familiar with brakes of the described or "Perrot" type, this results in releasing the outer brake in rounding a corner.

Each arm 86 is connected by a link 98, preferably having a slight play or lost motion to allow for the release of the outer brake in rounding a corner, to an idler arm 100 pivoted on one of the side frame members 10, which idler arm is in turn connected by a link 102 to an arm 104 on one end of a rockshaft 106 supported by the side frame members 10. Arms 108 depending from the ends of rockshaft 106 are connected by links 110 to the operating levers 42 of the rear wheel brakes. By this arrangement, links 98, 102, and 110 on each side of the car form substantially a straight line connection from the ends of rockshaft 106 to the brakes. The links are in practice protected by the running board.

Rockshaft 106 is shown as connected by a link 112 to a pedal 114 mounted on the transmission 116. An emergency brake 118 is also provided, being operated in the usual manner by a hand lever 120.

It should be observed that the band is anchored to plate 54 and, in action, engages drum 48 carried by the wheel. To secure effective action the brake anchor divides the band unequally, the longer part being self actuating for forward driving in order to lessen the manual effort required upon application of the brake.

While this self actuation may be, and is, desirable it should not become so great as to be a source of danger. The danger is more especially to be avoided in the case of the lighter front axle. When the brake band engages the drum it tends to rotate bodily with the drum, its rotation being resisted by its anchor on plate 54. This tends, obviously to similarly rotate plate 54 and with it, the steering knuckle and the whole front axle. By the position of arm 74 relative to part 76 mounted in the plate 54 and also relative to the brake 50, it will be seen that the tendency of plate 54 to rotate clockwise is equivalent to a tendency to swing arm 74 counter-clockwise and to effect a releasing action on the brake. There is thus provided a self actuating brake, but one wherein its reaction on its anchor plate is such as to prevent or minimize the rolling action of the axle which might accompany a severe braking application.

While one illustrative embodiment of our invention has been described, it is not our intention to limit its scope to that embodiment, or otherwise than by the terms of the appended claims.

We claim:

1. In a brake for vehicles, a non-rotating axle, a rotating wheel carried thereby, a drum on said wheel, a brake band engaging said drum, a rigid member anchoring said band, a rock shaft journalled in said rigid member, said rock shaft having an arm, a connection between said arm and brake, the position of said arm and connection being such as to release said band to an extent commensurate with the reaction of the wheel rotation upon the rigid member when the brake is applied.

2. In a brake for vehicles, an axle, a steering knuckle, mounted thereon, a wheel carrying a brake drum rotatable upon the spindle of said knuckle, a plate rigid with said knuckle, a band engaging said drum and anchored to said plate, rotatable means journalled in said plate for applying the band to the drum, means for connecting said brake applying means with said brake including a forwardly and downwardly directed arm whereby when the brake is applied the reaction upon the plate and axle is such as to lessen the intensity of brake application.

In testimony whereof we affix our signatures.

BENJAMIN JEROME.
WALTER D. APPEL.